Sept. 15, 1959  
G. T. RANDOL  
POWER-ASSISTED OPERATING MECHANISM FOR  
HYDRAULIC PRESSURE SYSTEMS  
Filed July 8, 1953  
2,903,855

INVENTOR:  
GLENN T. RANDOL,  
By George J. Mager  
HIS ATTORNEY

2,903,855

POWER-ASSISTED OPERATING MECHANISM FOR HYDRAULIC PRESSURE SYSTEMS

Glenn T. Randol, Mountain Lake Park, Md., assignor of fifty percent to Hamill-Markus Industries, Inc., Warren, Mich.

Application July 8, 1953, Serial No. 366,736

11 Claims. (Cl. 60—54.6)

The present invention relates generally to pressure differential operated servometers adapted primarily as an actuator for the master cylinder of hydraulic brake systems, or for actuating mechanical brake systems. The invention more particularly relates to an improved servomotor energizable to produce thrust which may be supplemented by physical operating force for use in vehicle brake systems, although other uses are obviously feasible.

The primary object of the present invention is to provide a booster mechanism for hydraulic brake systems, which includes novel resilient reactive means for imparting to the vehicle operator physical awareness of brake pressure buildup to the point whereat the fluid-displacing element becomes substantially stabilized More specifically, it is an important object of my invention to provide novel resilient means which includes a normally preloaded spring, disposed between a driver-operable pedal and hydraulic pressure producing device, for automatically transmitting its reactive biasing force via said pedal to give the driver awareness or physical perception, of the brake-applying force engendered in response to incremental depression or release of the pedal aforesaid, said spring being characterized by progressively increasing tension above a normal pre-energized status as the pedal stroke increases in a brake-applying direction.

In other words, the present invention provides for the driver what may be termed a "feel" of the brake application in that, subsequently to initial depression of the pedal, the intensity of the biasing forces inherent in said spring arrangement will vary substantially up to the point the column of brake fluid becomes sufficiently pressurized to apply the brakes, and resistance to movement of said pedal to control the servomotor to effect such pressurized state of the brake fluid is automatically communicated to the foot of the driver via said spring arrangement.

In power brake mechanisms heretofore, various flexible reactive vacuum-diaphragm arrangements which include non-reactive springs and associated elements have been incorporated for the purpose of providing driver "feel" during brake-applying operations. However, it is generally agreed that all of these devices have at least one disadvantage, that is to say, they fail to provide concurrent driver "feel" as hydraulic pressure increases to apply the brakes. As will appear hereinafter, the present invention incorporates novel means for overcoming this disadvantage.

To this end, it is another important object of my invention in its preferred embodiments to provide means whereby "feel" or reaction is transmitted to the driver via an air control valve directly associated with the brake-operating pedal. In a modified embodiment, the reaction is transmitted to the driver via means directly associated with the brake-operating pedal but independent of such air control valve.

Further objects of my invention include the provision of novel adaptation of the conventional return spring for the movable power assembly of a vacuum-operated motor whereby said spring has a threefold functional purpose; namely, (1) to bias the power assembly toward released position without opposing movement thereof in a thrust-applying direction to apply the brakes, (2) to bias the associated air control valve element toward closed position in opposition to control pedal depression to open said valve, and (3) to impart reaction on the control pedal according to movement of the power assembly in a thrust-applying direction; and optionally, an auxiliary return spring may be incorporated to assist the first-named return spring in retracting the power assembly to its released position.

With reference to said combined return and reactive spring, it is a further and important object of the invention to provide an arrangement whereby the normal biasing forces inherent therein to retract the movable power assembly of the vacuum power unit are nullified by pedal depressions, so that the maximum available vacuum power may be utilized in the course of brake-applying operations.

A further object of the present invention is to produce in a power-brake system for automotive vehicles of the type referred to, novel pedal control of fluid pressure brake applying means whereby pedal movement is not limited to the actuating movement of the power control valve operatively associated therewith, thus to provide a range of additional or supplemental movements of the pedal to that required for valve actuation thereby, for controlling such brake or thrust-applying operations in cooperation with, or independently of the fluid pressure motor without actuating said control valve beyond its full brake applying position of control.

An object related to the object immediately above is to provide in said power control valve a novel actuatable element for controlling the fluid pressure operable means, actuation of said element being limited to full "on" and "off" positions notwithstanding the pedal is capable of the aforesaid additional relative movement with respect to said element in a brake applying or releasing direction; means whereby a depressing or release movement of said pedal at any position along its fully operating stroke simultaneously actuates the valve element toward open or closed position respectively thus to provide a corresponding fluid pressure operation of the brake applying means, said means accommodating movement of said pedal to its fully released position in readiness for another brake application after said valve element attains its fully closed position, whereby the aforesaid relative movement status of said pedal and element is fully restored.

In the interest of brevity, other objects and salient features will be noted hereinafter in lieu of presenting them categorically in this general statement of the nature of my invention. A more comprehensive understanding of the advantages of the invention and its mode of operation may be derived from the detailed description thereof to follow with reference to the drawings which accompany this specification.

In the drawings:

Figure 1 is a schematic view partly in side elevation of my improved liquid pressure producing mechanism constructed in accordance with the present invention and shown exemplarily connected diagrammatically to operate a hydraulic brake system of an automotive vehicle and the like;

Figure 2 is a longitudinal sectional view on an enlarged scale, partly in side elevation, of the hydraulic brake operating mechanism per se illustrated in Figure 1 wherein the brakes are fully released;

Figure 7 is a sectional view taken on the line 7—7 in Figure 6; and

Figure 8 is a view similar to Figure 6, demonstrating an operatively adjusted disposition of the Figure 6 construction.

Figures 1, 2, 6, 7:
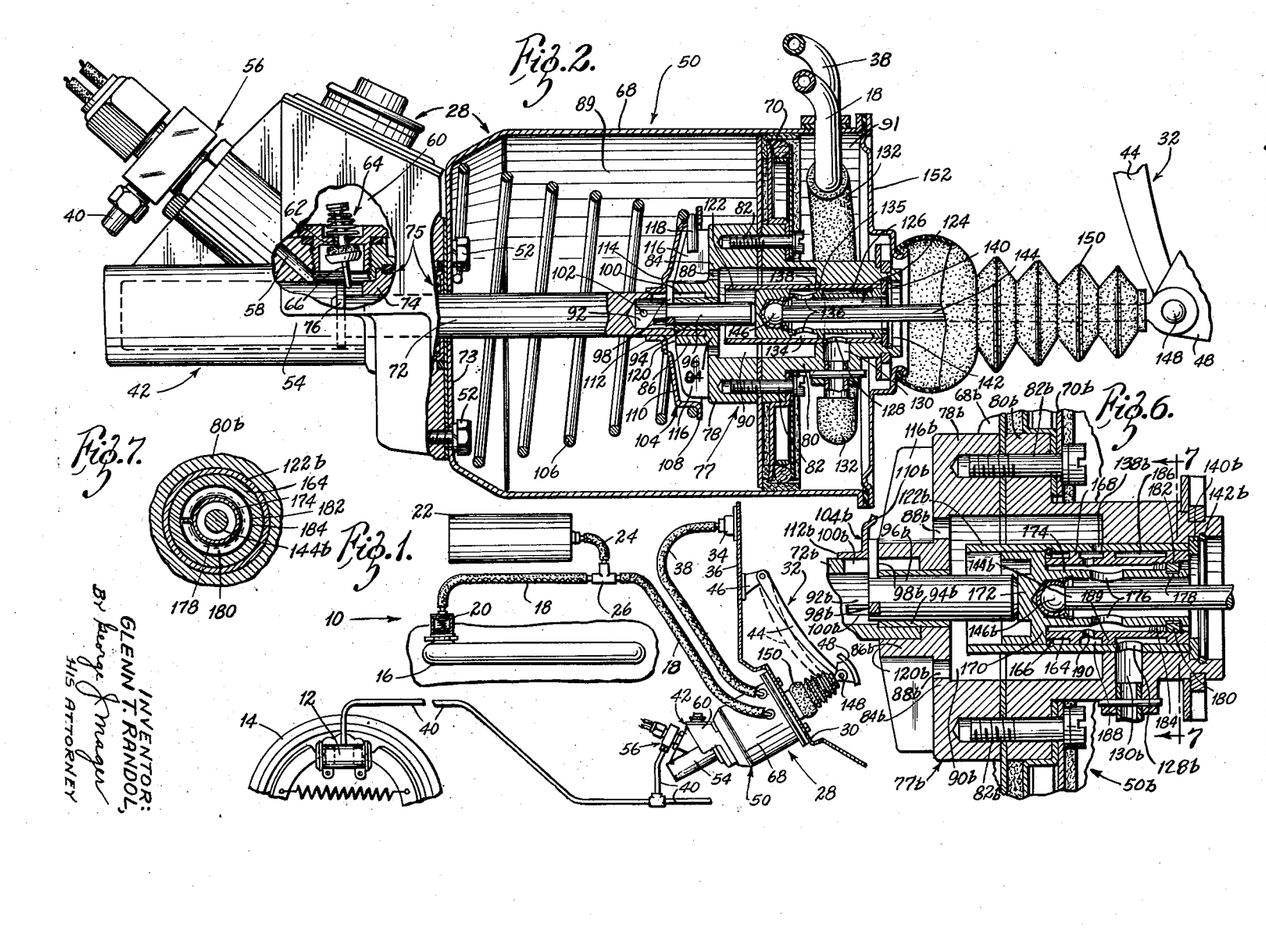

Referring to the drawings:

An exemplary hydraulic brake system wherein the present invention may be incorporated is illustrated in Figure 1, and designated as a whole by the numeral 10. Included in the system 10 is a hydraulic brake cylinder assembly 12 associated with a vehicle wheel 14; the vehicle engine intake-manifold 16; a conduit 18 provided with a check valve 20 leading from the manifold; a diagrammatically shown vacuum-energized reserve tank 22 connected into the conduit 18 via conduit 24 and a suitable fitting 26 as shown, or otherwise; the brake operating mechanism or device comprising the instant invention which is generally designated 28, and which is shown rigidly secured to the toe-board portion 30 of the driver compartment of the vehicle for illustrative purposes only; foot-operable linkage generally designated 32 which as will be seen, constitutes the primary actuating means with respect to the device 28; an air filter 34 mounted on the vertical forward wall 36 of the driver compartment below the instrument panel (now shown); a conduit 38 leading from the device 28 to said filter 34; and suitable piping designated 40, which serves to deliver fluid under pressure from the hydraulic master cylinder unit 42 of the device 28, concurrently to the brake cylinder assembly 12 of each of the wheels 14 with which the vehicle is equipped.

Excluding the novel construction and operational concept of the device 28, the system 10 thus far described is a conventional one, and is deemed to be well understood without requiring detailed explanation. However, in the interest of clarity in the description below, a few brief observations are given. Thus, the check valve 20 is provided in order to enable the operator to utilize stored vacuum for limited braking operations when the engine is not operating, and also to maintain uniform vacuum conditions in the system irrespective of pressure changes within the manifold when the engine is in operation. The foot-operable linkage 32 includes an arm 44 pivotally mounted at its upper end in a fixed bracket 46, and provided on its lower end with a pedal 48, as shown.

Figures 3, 4, 5, 6:
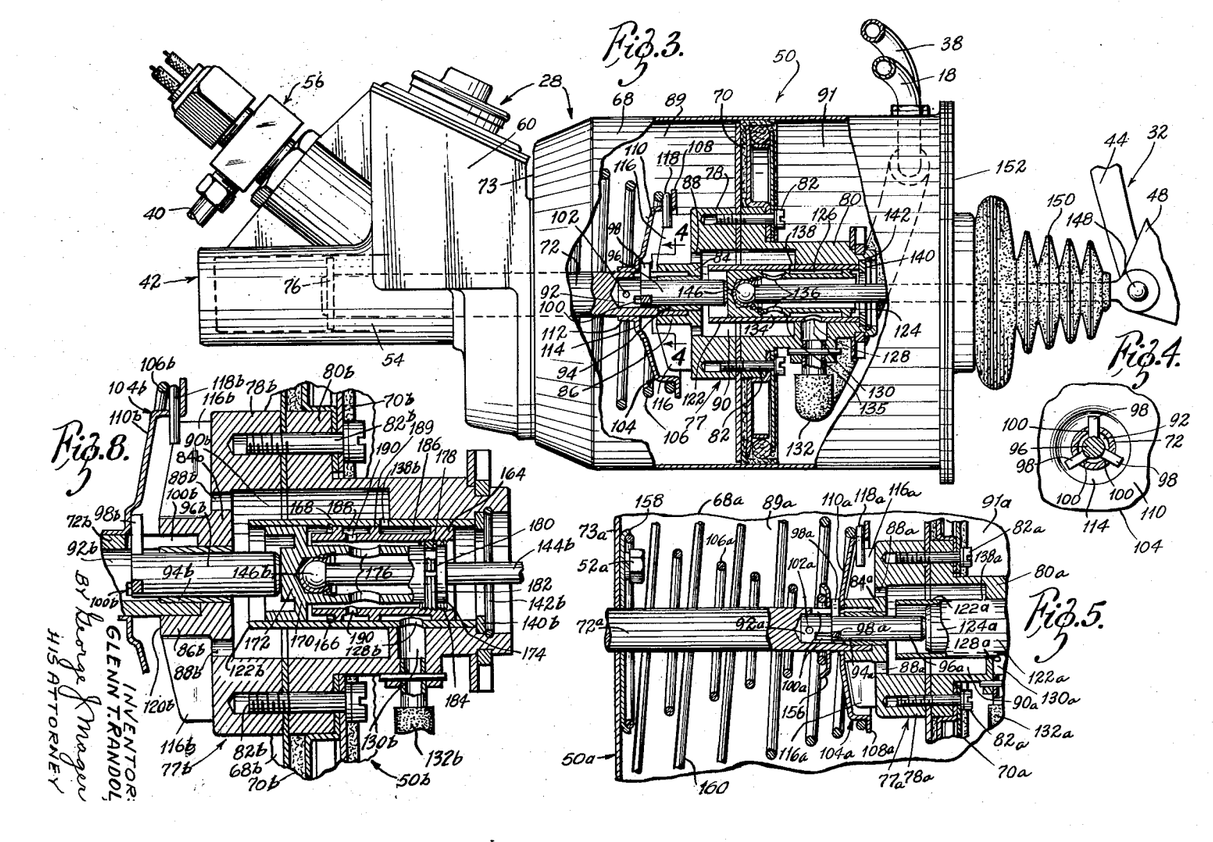
Figure 3 is a view substantially similar to Figure 2, with the operating mechanism shown in brake-applying disposition.
Figure 4 is a fragmentary sectional view taken on the line 4—4 in Figure 3.
Figure 5 is a fragmentary longitudinal sectional view illustrative of a slightly modified construction.
Figure 6 is a fragmentary longitudinal sectional view on an enlarged scale, wherein another slightly modified construction is presented.

With particular reference now to Figures 2 and 3, the differential pressure operated brake mechanism 28 of the present invention is operably associated with the hydraulic pressure producing master cylinder or device 42, and is exemplarily illustrated as a vacuum-actuated servomotor generally designated 50, said servomotor and device being integrated to provide a composite unitary assembly by means of cap screws 52 as shown, or otherwise.

The device 42 includes a hydraulic cylinder 54 having a pressure working chamber in fluid communication with a conventional residual pressure check-valve 56 via an angular passage 58, whereby fluid under pressure may be transmitted from the cylinder 54 to the piping 40, and thence to the brake cylinders 12, as will appear. Said device further includes a reservoir 60, which is normally in fluid communication with the hydraulic cylinder 54 via a tapered opening 62 controlled by a compensating valve assembly 64. This valve assembly as previously noted, is of conventional design, and as clearly shown in Figure 2, the lower end of its operating stem 66 projects into the cylinder 54.

The novel mechanism of the vacuum-actuated unit 50, which unit as previously noted, is rigid with the hydraulic unit 42, is enclosed within a cylinder 68 comprising two fluid chambers or campartments isolated by a pressure-responsive element or wall disclosed as a piston assembly 70 reciprocable therein, and a pressure-transmitting member more specifically designated a piston rod or plunger 72 which passed through the bottom wall 73 of said cylinder, through a bearing portion 74 of unit 42, and into the working chamber of hydraulic cylinder 54. Suitable sealing means generally indicated at 75 are provided to seal off the fluid in cylinder 54 from the interior of the cylinder 68, as shown. The left or forward end of the piston rod 72, has suitably affixed thereto a circular plate or disc 76 the diameter of which is smaller than the internal diameter of the hydraulic cylinder 54, but larger than the external diameter of the piston rod. Normally as will be seen, the disc 76 engages the valve stem 66 whereby to unseat the valve assembly 64, thus placing the reservoir 60 in communication with the hydraulic working chamber of cylinder 54.

Numeral 77 designates a valve housing comprising, as viewed in the drawings, complementary left and right end sections 78 and 80 respectively. The two sections are rigidly clamped together by cap screws 82 which screws also serve to mount the piston 70 on the housing 77 as clearly shown. The front wall 84 of the left end section is provided centrally with a projecting hollow boss 86, and has formed therein one or more ports 88, whereby to establish communication between the vacuum power compartment 89 of the cylinder 68 and the annular chamber 90 in the valve housing 77 while the other compartment 91 is maintained at atmospheric pressure via conduit 38 and the air filter 34.

The right or rear end of the piston rod 72 is axially bored as at 92, and is preferably pressfitted into the boss 86 as shown. Numeral 94 designates a bearing sleeve pressfitted through a circular opening in the wall 84 into a counterbore of the axial bore 92. Slidably mounted in said sleeve is a plunger member 96, the left or forward end of which is provided with a plurality of integrally formed outwardly projecting radial lugs 98, three being preferable as illustrated in Figure 4. The bored end 92 of the piston rod is provided with three circularly spaced longitudinal slots 100 through each of which one of the radial lugs 98 normally projects in predeterminately spaced relation with respect to the forward end of said slots to provide what may be termed lost-motion disclosed as a lost-motion mechanical connection for limiting relatively operating movement between the member 96 and piston assembly 70, and is further provided with a radial exhaust port 102 adjacent the closed end of the axial bore which serves to relieve air compression during operational movements of the plunger, as will appear.

Numeral 104 indicates movable abutment means disclosed as a substantially cup-shaped spring seat for a normally preloaded compression spring 106, which spring is preferably of conical configuration and is disposed about the piston rod 72 between the circular projecting flange 108 of said seat and the bottom wall 73 of cylinder 68. The bottom wall 110 of said spring seat has a projecting bearing sleeve segment 112 about the piston rod 72, said sleeve segment being surrounded by a flat circular segment 114 against which the radial lugs 98 are seated. Projecting forwardly from the front wall 84 of valve housing section 78 is a series of reinforcing ribs 116, integrally formed with said wall and with the boss 86. The final convolution of the conical return spring 106 at its smaller end, terminates in an inturned segment 118 which, extends through a circular opening provided therefor in the spring seat member, and projects into the space obtaining between two of the adjacent reinforcing ribs 116 aforesaid to stabilize the spring in axial alignment with its seat. The forward face of the boss 86 is identified by the numeral 120. The aforesaid plunger 96, radially disposed lugs 98 projecting outwardly on said plunger and the movable spring seat member 104 form what may be termed "operating mechanism" for the reactive and return spring 106, said mechanism being carried by and juxtaposed in part with respect to said power-piston 70.

The right end section 80 of the valve housing has press-fitted therein a tubular member 122, the major portion of which extends into the chamber 90, and surrounds the free end of the plunger 96. Reciprocably mounted in the tubular member 122, with its left end contiguous to said free end of the plunger, is a generally cylindrical air control valve element or piston 124, which has a first external annular groove 126 formed thereon, said groove being in constant communication with the vacuum-power tank 22 via an opening 128 in tubular member 122, a passage 130 in the valve housing section 80, a flexible connection 132, and conduit 18. The valve piston 124 also has a second external annular groove 134 formed thereon, said groove normally connecting the power chamber 89 to atmosphere via openings 136 in the valve element, a port 138 in the tubular member 122, annular chamber 90, and ports 88 aforesaid, atmospheric chamber 91 and conduit 38. An annular working land 135 separates the two grooves, and is operative to selectively connect the port 138 to atmosphere and to the vacuum source, as clearly shown in Figures 2 and 3.

As best seen in Figure 2, movements of the valve piston 124 to the right are limited by an abutment ring 140 maintained in position by a split retainer ring 142. Numeral 144 designates a valve push-rod having at one end a ball and socket connection 146 with the valve piston 124, and at its other end, a pivotal connection 148 with the pedal member 48. A flexible bellows 150 surrounds that portion of the valve rod which projects through the toe-board 30 into the driver compartment, said bellows being suitably supported from the cover 152 which seals the upper end of the power cylinder 68.

In the modified construction of the invention illustrated in Figure 5, an auxiliary normally pre-tensioned spring 106a is employed to transmit "feel" of brake application to the operator, as will be explained. All elements which appear in this view, and which have previously been described, are identified by the same reference numerals distinguished, however, by the addition of the letter "a" to each. It is to be noted, however, that the lengths of the longitudinal slots 100a in the piston rod have been increased, and that the radial lugs 98a, which project outwardly through said slots, engage against a spring seat 156 slidable on said rod. Numeral 158 indicates a centralizing spring seat secured to the bottom wall 73a of cylinder 68a, and disposed about the piston rod between the said two seats is the spring 106a, as shown. An auxiliary compression spring 160 is provided in this modified structure to supplement the return action of the reactive spring 106a on the power-piston assembly 70a when operator force is removed from the pedal 48. This auxiliary spring is installed under a normally preloaded condition and is effective to continuously oppose movement of the power-piston assembly 70a to drive the plunger 72a into the hydraulic cylinder 54 whereby liquid in said cylinder is pressurized. The movable spring seat member 104 of the first embodiment is installed behind the radial actuating pins 98a so that the latter cannot displace this seat member out of engagement with the power-piston assembly 70a. The auxiliary spring 160 is operably disposed to bear at one end on the end wall 73a of the power cylinder 68a and the other end reacts on the seat member 104a, said spring being of larger diameter than the reactive spring 106a in the preferred construction, and therefore, it encircles the smaller diameter spring and, as noted, both springs have their corresponding ends bearing on the end wall 73a with the end of spring 106a centralized between the larger spring and plunger 72a by the cup-shaped seat member 156 fixed to said end wall 73a while the opposite corresponding ends of said springs 160, 106a react on the seat member 104a carried by the power-piston assembly 70a and the seat member 158 movably disposed on the plunger 72a respectively.

In the modified construction of the invention illustrated in Figures 6 through 8, the air control valve element is tubular throughout, and the ball and socket connection 146b is disposed in a telescopically-related piston member which is yieldably interconnected with said valve element, as will be explained. All structural elements which appear in these views, and which have been previously described, are identified by the same reference numerals distinguished, however, by the addition of the letter "b" to each.

The modified air control valve element is designated 164, and is slidable in the tubular member 122b between the abutment ring 140b and a split stop ring 166 which is seated in an internal groove provided therefor in said tubular member as shown. The normal or brake-released position of the valve element 164 is exhibited in Figure 6, wherein it is seen that the right end of said element abuts the ring 140b, whereas a projecting annular flange 168 thereof is disposed in spaced relation to the right of the stop ring 166.

The piston-like member earlier referred to is designated 170, and is also slidably disposed in the tubular member 122b. It includes a socket segment 172 disposed contiguous to the free end of the plunger 96b, and a sleeve segment 174 disposed within and coextensive with the valve element 164. As shown in the drawings, the valve rod 144b has a ball and socket connection 146b with segment 172, and rightward movement of the member 170 is limited by the stop ring 166. The sleeve segment 174 which is smaller in diameter than the valve element 164, has formed therein circular openings 176 and an annular external groove 178 in which, as particularly demonstrated in Figure 7, is seated an expansive yieldable split ring or collar 180. The periphery of the collar 180 has formed thereon a series of parallel and closely generated V-shaped serrations 182 which cooperate with a series of complemental shaped internal grooves 184 provided in the valve element 164, thus to yieldably interconnect the member 170 and said valve element for limited movement together. First and second annular external grooves 186 and 188, respectively, are formed in spaced relation by an annular land 189 on the valve element 164, the groove 188 communicating with the hollow interior of said valve element via radial ports 190.

The first external groove 186 is in fluid communication with the vacuum-power device 50 in the identical fashion described relative to the groove 126 of the Figure 2 embodiment of the valve element. The second external groove 188 normally vents the servomotor vacuum chamber 89 to atmosphere via ports 88b, annular chamber 90b, port 138b, ports 190, ports 176, atmospheric chamber 91, and conduit 38 and air filter 34, illustrated in Figures 1 and 2.

It is noted that one of the features inherent in the Figures 6 through 8 construction, is that wear with respect to the air control valve element 164 is negligible, in that pedal forces are not applied thereto directly, as should be manifest but will be more fully explained hereinafter.

*Operation*

The main embodiment of the invention is exhibited in Figures 2 through 4, and the operation thereof will now be explained with reference also to Figure 1. The normal, that is the brake-released status of the included mechanism is depicted in Figure 2, wherein the disposition of the pedal member 48 corresponds to that illustrated by full lines in Figure 1. The operative, that is the brake-applied status of the included mechanism is depicted in Figure 3, wherein the disposition of the pedal member 48 corresponds to that illustrated by broken lines in Figure 1.

In the brake-released status of the mechanism, the conical compression reactive and return spring 106 biases the motor piston 70 and consequently its associated rod 72 to the position thereof portrayed in Figure 2. As a result, the annular element 76 tilts the stem 66 of compensating valve assembly 64 whereby the hydraulic chamber of cylinder 54 is placed in fluid communication with reservoir 60. As a further result, plunger 96 maintains the air control valve piston 124 against the abutment ring 140 whereby to place the pedal 48 in actuatable status, and to simultaneously provide a non-communicative relationship between the power cylinder chamber 89, the reserve tank 22, and the engine intake-manifold 16, as should be apparent from the preceding description augmented by an inspection of Figures 1 and 2.

The lost-motion connection 98, 100 which defines the relative operating movement of the valve element 124, with the brakes released as portrayed in Figure 2, is fully established between the radial pins 98 and forward ends of the longitudinal slots 100 in the plunger 72 with the opposite sides of the pins in engagement with the confronting circular end of the piston boss 86. The inner marginal surface of the sleeve segment 112 engages the confronting sides of the pins under influence of the reactive spring 106 whereby the pins are normally impinged between said sleeve segment and boss 86, best demonstrated in Figure 2, in readiness for pedal actuation to control a brake-applying operation of the hydraulic cylinder 54 assisted by the servomotor 50 as is understood. During relative movements of the spring seat 104 accommodated by the lost-motion connection aforesaid, the cylindrical valve elements 96, 124 are moved simultaneously therewith by the pedal 48 via interconnecting link 144 to dispose valve working land 135 to the left of port 138 to open the latter (see Figure 3) thereby energizing the power piston assembly 70, the degree of energization being determined by the extent to which the port 138 is exposed to the annular vacuum channel 126. At full open position of the valve piston 124, the radial pins 98 are brought into engagement with the forward ends of the slots 100 wherein the lost-motion therebetween is fully taken up enabling pedal-actuation by the operator to be applied "straight-through" via said pins to operate the plunger 72 to apply and release the brakes supplementary to power assistance provided by the servomotor 50, and in the event of complete power failure the brakes may be operated in this manner by the foot. It is important to observe here, that during pedal actuation of the valve piston 124 to control power assistance by the servomotor 50, the spring 106 does not oppose movement of the power-piston assembly 70 since the lost-motion connection aforesaid enables the spring seat 104 to move ahead of the movement of the piston 70 corresponding to any given valve open position until the lost-motion is taken up for direct foot operation of the hydraulic cylinder 54 as explained above. Accordingly, this novel arrangement of spring control in a brake-applying direction provides maximum utilization of the differential pressures acting across the piston 70 to assist in applying the brakes since the biasing effect of the return spring 106 is removed from the piston during power assistance operations thereof; but on release of pedal 48, this novel spring arrangement becomes effective on the piston 70 via the pins 98 engaging the boss 86 to return the power assembly to released position depicted in Figures 1 and 2 and at the same time provides the operator with a sense of the degree of release and returns the valve piston 124 to its normal closed position, best illustrated in Figure 2 wherein the valve working land 135 is disposed to the right of the port 138.

It should also be noted that the biasing action of spring 106 supports the weight of the pedal and its associated link 144 in the fully released position of said pedal, said spring preferably having been initially installed in the power cylinder in pre-stressed condition. In consequence of this arrangement, reaction or "driver feel" is always in evidence at the touch of the pedal, irrespective of the degree of pedal depression. Manifestly, whenever the pedal is incrementally depressed during a brake-applying operation, reactive evidence becomes increasingly pronounced inasmuch as the spring 106 becomes increasingly stressed, as the piston 70 advances leftward to apply the brakes. In other words, the reaction is instantaneous, (there being no lost-motion movement of the pedal as found in prior art arrangements); and further, the reaction is constantly and increasingly effective throughout the full operating stroke of the pedal up to the point the column of brake fluid becomes pressurized, and thereafter, reaction becomes substantially constant. Thus, smooth braking control is provided throughout the range of pedal movements from fully released to fully depressed positions thereof.

It is also noted that the vacuum-power cylinder compartments 89, 91 are in communication with atmosphere to equalize the pressures on opposite sides of the power piston 70, via filter 34, conduit 38, air control valve 124 and the circular openings 136 therein, chamber 90 and ports 88.

Assuming now, that with the vehicle engine in operation, it is desired to apply the brakes, the pedal 48 will be actuated by the driver's foot in the ordinary manner.

Initial depression of the pedal causes the air control valve piston 124 to move leftward relatively to the power piston 70 until the annular working land 135 thereon comes into registry with the port 138. As a result, communication between atmosphere and vacuum chamber 89 is interrupted momentarily, while at the same time, plunger 96, which obviously moves leftward also a corresponding distance, further compresses the spring 106 slightly without disturbing the stationary aspect of the piston 70 and its rod 72. This is so because the radial lugs 98 are free to move leftward in the slots 100 independently of the piston and rod, and are in engagement with the flat segment 114 of the cup-shaped spring seat 104. The radial port 102, as previously pointed out, prevents any pressure buildup in the axial bore 92 as the plunger progresses.

Assuming now that the pedal is depressed slightly further, the valve piston 124 and the plunger 96 also advance therewith, whereby to uncover the port 138 while additionally compressing the spring 106. Simultaneously with the uncovering of the port 138 however, vacuum chamber 89 is placed in fluid communication with the vacuum source via ports 88, chamber 90, port 138, annular groove 126, passage 130, flexible connection 132, and vacuum conduit 18. As a result, the power piston 70 and its rod 72 immediately move to the left because of the pressure differential set up across opposite sides of the piston 70 as is understood. Initial movement of the piston rod effects disengagement of its disc 76 from the depending stem 66 of the compensating valve assembly 64, whereby said assembly automatically seals the opening 62 to prevent fluid communication between the hydraulic chamber of cylinder 54 and reservoir 60. Beginning at this point in the operation of brake application, and upon further depression of pedal 48, the piston 70, its rod 72, the valve piston 124, and the valve rod 144 advance as a unit with said pedal, whereby to cause hydraulic pressure to be increasingly applied via angular passage 58, residual check-valve 56 and piping 40 to the brake cylinders 12, in consequence of volumetric displacement of fluid under pressure from the hydraulic chamber aforesaid.

Manifestly, as the unit referred to advances incrementally to the brake applied position thereof illustrated in Figure 3, the inherent and thus further compressed expansive force of the return and reactive spring 106 transmits to the driver's foot successive reactions corresponding in intensity to the distance the pedal 48 has moved in such brake-applying direction.

Thus it should be evident that my invention provides a novel and improved pedally-controlled power brake mechanism, wherein initial depression of the pedal 48 actuates the valve piston 124 to first isolate the vacuum chamber 89 from atmosphere, to thereupon evacuate said chamber and concurrently seal off fluid communication between the chamber of hydraulic cylinder 54 and reservoir 60 as the power piston 70 and its rod 72 are caused to advance in consequence of atmospheric pressure in chamber 91 acting across the piston 70, and to thereafter by a combination of evacuation, atmospheric pressure, and pedal depression, to increase or decrease the hydraulic pressure of brake application as required.

At the same time it should be apparent that the invention provides for the operator by way of the spring 106, an ever-present and automatically discernible "feel of the brake situation," irrespective of the extent of pedal depression.

The operational behavior of the new and novel reactive and return spring 106 referred to above, produces control characteristics in the way of reaction against which the control valve piston 124 is adjusted to control operative energization of the vacuum-motor 50. This reaction increases above normal preloaded status of this spring in direct proportion to the distance the pedal 48 is depressed, and therefore, such spring resistance alone would not necessarily have a magnitude correlated with the amount of braking force in effect at every position of the brake-pedal, and too, pedal-load would increase toward the end of the full operating stroke of the plunger 72 actuated by vacuum-motor 50 to an undesirable degree which would defeat the objective of reduced pedal effort.

As this spring is additionally compressed above its normal preloaded status, it provides increasing resistance in relation to pedal movement up to the point the fluid becomes initially pressurized, and thereafter, resistance becomes substantially constant on the pedal 48 as a consequence of the substantially stationary condition of the fluid-displacing parts acting on the non-compressible column of fluid as is understood. Since the fluid becomes pressurized at different stations along the full operating stroke of the motor-actuated plunger 72 due to wear on the brake linings and parts, and to leakage of the various seals in the hydraulic braking system, it will be appreciated that if the pressurized state of the fluid to apply the brake becomes effective toward the end of the full operating stroke of the plunger 72, that the reaction from the spring 106 can become severe resulting in a moderately "hard-pedal" due to rapid buildup in the force of this spring from its normal preloaded status, the latter providing the operator with accurate sensing to initially apply the brakes thus preventing sudden braking applications which could possibly result in a power-surge if the operator lacks this awareness as he presses the pedal.

Reduction of this spring principle to commercial usage, has demonstrated that the preloaded weight should be approximately 20# and rated at maximum compression corresponding to the end of the full operating stroke of the plunger 72 at 60# pressure which when transmitted through the pedal leverage ratio reacts on the operator's foot at 5 to 15# through the full operating range of the plunger 72 where a normal height pedal is employed; but if the pedal ratio is lowered to accommodate use of a "low-pedal" with less mechanical advantage, reaction from this spring increases proportionally to a limited extent that converts the low-pedal into a moderately "hard-pedal" as aforesaid through the stage of operating the control valve piston 124 from normal closed position to operating position to control operation of the vacuum-motor 50. Accordingly, this spring serves to best advantage as a reaction means by utilizing its yielding resistance through substantially the first-half of the series of pressurizing movements along the full operating stroke of the plunger 72 which may be had by keeping the brakes properly adjusted and the system free of leaks which serv- ice operations contribute to safer driving. If a slower rated spring is utilized then reaction of sufficient magnitude at points beyond the halfway mark of the plunger stroke in a pressure applying direction does not provide the operator with the necessary physical perception of the effective braking force.

With attention directed to Figure 3, it is noted that the invention provides safeguard means in the event of partial or entire power failure. It will be remembered that the disposition of the mechanism exhibited in Figure 3 presents the normal brakes-fully-applied status, wherein the vehicle is at a standstill, or should be as is understood. However, should it perchance happen that the vacuum-power force per se would fail to arrest movement of the vehicle completely, a slight additional pedal depression is provided for, in that in consequence thereof, the radial lugs 98 may be brought to bear against the end walls of slots 100, whereby the power piston 70 and its rod 72 can be advanced directly and solely by driver foot application, resulting in increased hydraulic pressure delivered to the brake cylinders 12.

From the foregoing, it should be clearly apparent that this invention is admirably suited for incorporation in trucks, busses, and the like vehicles which travel along highways including curving stretches of an alternately ascending and descending nature. It should likewise be apparent how intermittent full brake application and partial release operations may be attained and instinctively controlled effortlessly by pedal actuation on the part of the operator. It should further be apparent that the mechanism enables the operator to normally apply a "brake-holding" status to the system at any point within the range of pedal movements which may be had between the Figure 3 disposition of said mechanism, and the disposition thereof which obtains when the annular working land 135 of control valve 124 is in registry with the port 138 responsive to halting the pedal at such point with consequent slight advance of the power piston 70 with respect to the valve piston 124 to "lap" the land 135 and port 138.

It is of course to be understood that when said valve land is in registry with port 138 the latter is covered, inasmuch as the diameter of said port is of smaller extent than the width of land 135. Thus it should be evident that whenever pedal depression ceases at any point in a brake-applying operation, lapping of said port and land automatically follows, in consequence of which action the brakes are held "on" by the then existing substantially counterbalancing forces acting on opposite sides of the power piston 70.

The Figure 5 embodiment of the invention operates in substantially the same manner as the main embodiment. In this modified construction, however, the spring 160 functions only in the usual and conventional sense of returning the power piston 70a to brake-released position in response to closing of the air control valve. That is to say, said spring 160 is a conventional conical compression spring which is initially installed in cylinder 68 in a precompressed condition. Consequently, this spring does not transmit any "brake feel" whatever in accordance with the concepts of my invention, as should now be understood.

In the Figure 5 modification, the pre-tensioned or pre-stressed auxiliary conical spring 106a, disposed about the piston rod 72a between the stationary spring seat 158 and the slidably mounted spring seat 156 is the element which co-operates with spring 106a to return the vacuum-actuated piston 70a to normal released position as illustrated in Figure 2 and also serves to transmit to the pedal 48, the "feel" of brake application according to the operating stroke of piston 70a in applying the brakes. The said spring 106a, movable in response to movements of plunger 96a and its radial lugs 98a, relative to the power piston 70a, is initially installed in the cylinder in a pre-compressed condition according to the degree of initial reactive force desired on the pedal 48, so that it operates in the same manner as that described with respect to the conical return spring 106 of the main embodiment. In other words, since spring 106a is independent of the return spring 160 and is pre-tensioned, its action is not affected by the concurrent forces exerted by said return spring so that selective reactive springs 106a may be utilized to gain the desired reaction without modifying the return spring 160. As previously noted, the longitudinal slots 100a are of greater length than those of the main embodiment, whereby to accommodate a slightly increased advance of the radial lugs 98a in additionally energizing the spring 106a in response to pedal depression.

It is noted with respect to the Figure 5 modification, that the pre-tensioned reactive spring 106a and slidable spring seat 156 arrangement is suitable also for effective operation in conjunction with the now to be described modified air control valve construction portrayed in Figures 6 through 8.

In the said Figures 6 through 8 embodiment of this invention, a novel modified air control valve element 164 exhibits a yieldable ratchet connection between it and a piston-like member 170, the latter having a ball and socket connection with the pedally movable valve rod 144b. The yieldable connection referred to comprises the split expansible ring 180 seated in an external annular groove 178 provided therefor in said valve element, and having annular minute V-shaped peripheral serrations 182 as previously described. These serrations or grooves are closely generated in parallel circular relationship, and engage in the corresponding internal grooves 184 on the valve element 164. It is noted as illustrated in Figure 6, that a series of normally non-engaged internal grooves 184 are provided to the left of the ring 180, whereby to accommodate slight additional movement of the piston member 170 and the valve rod 144b relatively to the valve element 164 after the pedal 48 has been depressed sufficiently to bring the annular flange 168 of said valve element into engagement with the stop ring 166.

An exemplification of a relative disposition of the mechanism corresponding to that just described is exhibited in Figure 8. There it is seen that the air control valve element 164 has been advanced from the Figure 6 disposition thereof, by pedal depression to a position wherein the annular flange 168 abuts the stop ring 166. Up to that point, said valve element and the piston member 170 had moved in unison because of the yieldable connection described, and the reactive spring 106b had been further compressed whereby to transmit "brake application feel" to the driver via plunger 96b, piston member 170, ball and socket connection 146b, valve rod 144b, and pedal 48. With left movement of the valve element arrested, additional pedal depression causes the resilient expansible ring 180 to contract and thus ratchet over the internal serrations 184, whereby the piston member 170 advances independently of the valve element while retraction of the piston member responsive to pedal release, effects simultaneous movement of the valve element to closed position followed by restoration of the relative positions of the piston member and valve element as exhibited in Figure 6 wherein pedal 48 is in normal fully released position. In consequence of this arrangement, it should be manifest that brake application directly from the pedal may also be had via the plunger element 96b, its radial lugs 98b, and the longitudinal slots 100b while the valve element 164 is actuatable in unison with the pedal to open and closed positions at any point along the full pedal stroke to enable "on" and "off" operation of the brakes despite relative operation aforesaid of the pedal with respect to the valve element is accommodated following such opening and closure thereof.

Although the illustrated and described yieldable connection is preferable, it is noted that a split and therefore resiliently expansible ring having a smooth peripheral surface may be substituted for the serrated ring 180, and that a non-serrated internal bore may be provided in the valve element 164. In such an arrangement, the frictional coefficient obtaining between the expansible ring and the smooth bore of the valve element would provide the yieldable connection between said element and the piston member 170.

*Operational summary*

From the foregoing description, taken in conjunction with the various illustrations of the different embodiments of my invention, it will be seen that certain interrelated components of the pressure producing device possess similar functional characteristics such that interchangeability is readily effected, particularly in connection with the reactive spring controlling features and type of pressure-transmitting member 72 employed in the hydraulic cylinder 54, the latter may take the form of a piston having the same cross-sectional area as the pressure chamber, or a plunger of less cross-sectional area than the chamber 54 which, in the latter case, would eliminate machining the interior of the pressure cylinder with a longer working stroke required of the plunger. For example, the movable wall 70 may either be a piston or a flexible diaphragm connected to the pressure-transmitting member 72 with the adjacent end slotted at 100 with open ends and fitted with the bushing 94. This arrangement facilitates assembly of the cylindrical element 96 with the radial pins 98 installed integrally thereon or detachable. Where the pins 98 are inserted after the cylindrical element 96 has been placed in the position of Figure 2, then the bushing 94 could be dispensed with, and the slots 100 formed in the wall of the plunger 72 with closed ends, and while the cylindrical element 96 has been illustrated separate from the valve element 124 to avoid the need for critical axial alignment therebetween, these two elements may be formed integrally as the disclosure clearly depicts.

Further considering the novel advantages provided by the reactive and return spring means 104, 106, this novel spring control enables rating of this spring to whatever degree of reaction desired since its action never interferes with the movement of the power assembly 70. This spring is continuously effective on the brake pedal 48 via the spring seat 104, radial pins 98, cylindrical element 96, valve element 124 and link 144 so that immediate yieldable resistance to movement of the pedal is encountered by the operator with the inauguration of a brake-applying depression of the pedal. In this manner, the operator senses the degree of braking force being applied from the instant pressure is applied on the pedal as the spring 106 progressively builds up in reactive force substantially proportional to the corresponding operating position of the power-actuated plunger 72. Since the spring seat 104 must lead the piston boss 86 for valve actuation to control the power piston 70, the force exerted by spring 106 is rendered non-effective against the piston thus providing maximum effectiveness of the power phase with a resultant higher point at which "power-run-out" would become effective than would otherwise occur, the latter condition representing maximum power application of the brakes and should an even greater braking force be required for the given stopping or slowing operation of the vehicle, then the operator must apply such additional pressure to the pedal 48 via the pins 98 engaging the ends of the slots 100 to bring the total brake applying force to the degree required.

It is also important to note that the auxiliary spring 160 of Figure 5 modification may be incorporated in either of the embodiments Figures 1–4 or Figures 6–8 where a continuous biasing action is desired on the power-piston assembly 70, 70b to supplement the action of the reactive springs 106 or 106b respectively during release of the brakes as is understood. This arrangement would find practical application in installations of the present invention on heavy-duty vehicles and the like.

An important feature of braking control results from the use of a normally pre-energized spring, such as spring 106 acting on the pedal 48 to provide instant resistance to movement of the pedal, such that in the event the brakes are applied initially by a sudden thrust of the pedal, this spring gives the operator an awareness of pressure being applied so that the power-boost application may be brought in to assist the pedal operation without abrupt shock and grabbing. This smooth mergence of the power phase with the pedal operation after the latter has inaugurated pressure build-up in the spring, avoids the possibility of power-boost lock of the vehicle wheels with resultant tendency of throwing the car occupants forwardly out of their seats, and sometimes leads to personal injury, loss of control or a potentially dangerous skid. Thus, the present invention inherently provides full control, predictable response for complete braking safety without requiring special manipulation of the control pedal.

The present servomotor booster 50 is especially adapted for the replacement market since any conventional master cylinder assembly mounted in the engine compartment on the vehicle firewall and which utilizes for its operation a pivotally suspended pedal, may be used intact thereby appreciably lowering the cost to the car owner and greatly simplifying the installation where the unit is applied on after-market cars. This noteworthy feature is provided by the use of the novel reactive spring means 104, 106 incorporated in the servomotor itself. Thus, the present liquid pressure producing device 28 actually comprises two separate units; namely, the servomotor 50 operably combined with a factory-installed hydraulic master cylinder adapted for conventional foot operation as is understood. This novel application of servomotor boost to a conventional master cylinder retains all of the brake control features provided by the latter with substantial reduction in operator effort. Where the present invention is merchandised as an accessory or after-market installation, only the servomotor 50 is required since the master cylinder, pedal and linkage assembly, and dust boot factory installed on the car are utilized without alteration at great savings to the car owner to provide power assistance in operating the brakes with no more after-installation maintenance being required than normally expected with a conventional foot-operated system.

As the present disclosure clearly demonstrates, the servomotor 50 is the self-contained type in that it includes the reactive means on the operator control. This novel construction not only facilitates its installation in a motor vehicle, for example, but also utilizes the standard master cylinder without disassembly thereof to form a unitary power-assisted braking control where incorporated in a hydraulic brake system. In the case of mechanical brakes, then the servomotor actuated member 72 would be mechanically linked to the brake actuating cam with the reactive means 104, 106 serving to give the operator an awareness of the degree of braking force being applied by the servomotor for smooth braking applications.

Accordingly, the present invention provides a yieldable force, such as the illustrated spring 106, to constantly oppose the operator during operation of the braking system. This opposing force progressively builds up against the operator from a normally preloaded status, in substantially proportional relationship to the effective operating stroke of the movable wall 70. This is true, since the reactive force exerted by the spring increases as the pressure-transmitting member 72 is driven into the hydraulic chamber 54, thus giving the operator a "feel" or reaction from the instant he moves the pedal 48 to enable him to smoothly bring in the power phase with followup control to provide the degree of power-assistance desired until full power has been utilized if required.

The control valve 124 or 164 has the usual followup action, each of said valves being characterized by relative sliding movement with respect to its cooperating sleeve movable in unison with the power-piston assembly 70. As the power-piston moves on its pressure stroke, it tends to overtake, and "lap" the control valve element, unless brake-applying movement of the pedal 48 continues. Whenever the operator removes his force from the pedal, the control valve follows pedal movement relative to the power-piston assembly 70 into the position shown in Figure 2 wherein the power chamber 89 communicates with the atmosphere, by reason of the force exerted by the reactive spring 106 on the valve member 124, said spring also simultaneously acts on the power-piston 70, with the valve member aforesaid in the position noted, to return it to released position depicated in Figure 2.

If the operator desires to add physical force after the full force (power-run-out) of the servomotor 50 has been developed, or, if there is power failure, direct physical force on the plunger 72 can be exerted via the valve element 124, plunger 96, radial pins 98 engaging the forward ends of the slots 100.

From the foregoing description augmented by an inspection of the drawings, it should be manifest that my invention provides novel hydraulic brake operating mechanism adapted to achieve its objectives in a highly efficient manner.

Considering the terminology used in the foregoing description and in the appended claims, the identifying expressions and/or terms employed are intended to convey meanings which include the range of reasonable equivalents in the patent sense. For example; the expressions "servomotor," "vacuum-actuated servo," "vacuum-power assembly," "vacuum-actuated unit," "power mechanism," "power unit," "power device," "power cylinder," "vacuum cylinder," are intended to include any casing and/or chamber having a pressure-responsive movable assembly therein, whether such assembly includes a piston, or a flexible diaphragm, or some other member serving the same purpose. The terms "front," "rear," "right," "left," and other directional words or characters are intended to have only relative connotation for convenience in describing the structure as illustrated, and are not intended to be interpreted as requiring any particular orientation with respect to associated structure external to the present disclosure.

Although I have illustrated and described preferred embodiments of my invention, I do not wish to limit such to the exact construction or arrangement of parts shown, since it is evident that modifications and substitutions may be made therein without departing from the proper scope or fair meaning of the subjoined claims.

I claim as my invention:

1. In a fluid pressure actuated servo motor having a casing, a pressure-responsive motor element dividing said casing into two compartments and including an output member movable therewith, one of said compartments always being at atmospheric pressure, and conduit means for introducing a fluid at different-from-atmospheric pressures into the other of said compartments: the improvements of an operator actuatable valve in said conduit means for controlling the admission of fluid at said different pressures into said other compartment to displace said element in one direction; resilient means biasing said element in the opposite direction and biasing said valve in said opposite direction to a position at which fluid at said different pressures is blocked from said other compartment to subject both of said compartments to atmospheric pressure; actuatable mechanism carried by said element and in part juxtaposed with respect thereto for interconnecting said valve and resilient means for movement together; and a lost-motion connection having normally spaced engageable portions operably incorporated between said valve and said element to define the relative actuating movement of said valve whereby actuation of said valve is effective to relieve the bias of said resilient means on said pressure-responsive element.

2. In a servo motor as defined in claim 1, the further improvements of said valve being coaxial with said element, and said lost-motion connection being of limited extent in said one direction, so that continued operator actuation of said valve will effect operator displacement of said pressure-responsive element.

3. In a servo motor as defined in claim 1, the further improvements of said valve being disposed coaxially of said pressure-responsive element and being slideable in said one direction relative to said element, abutment means movable with said valve via said operating mechanism, said resilient means comprising a compression spring confined between said abutment means and that end of said casing toward which said element is displaced in said one direction, operator movement of said valve in said one direction compressing said spring ahead of said element.

4. In a servo motor as defined in claim 3, the further improvements of said abutment means being abuttable with said pressure-responsive element when said valve is at its said position blocking fluid at said different pressures from said other compartment to return said element and said valve in said opposite direction.

5. A booster brake mechanism for actuating the fluid-displacing means of a hydraulic master cylinder comprising: a source of pressure different from atmosphere; a pressure differential actuated motor having a cylindrical casing closed at one end; a pressure-responsive movable wall in said casing dividing said casing into two compartments, one of which is always connected to a constant pressure; a longitudinal bore in said movable wall closed at one end and open at the other; a pressure-transmitting member secured at one end to the movable wall; valve means including a valve element slideably mounted in the longitudinal bore for controlling connection of the other compartment to said source; a lost-motion mechanical connection between the valve element and the pressure-transmitting member providing limited relative operating movement therebetween; a manually actuatable member for sliding the valve element to connect the other compartment to said source; a spring seat member slideably mounted on the pressure-transmitting member and normally engaging both the valve element and movable wall when the valve element is ineffective to connect the other compartment to said source; spring means operably disposed between the closed end of said casing and the spring seat member to yieldably oppose sliding movement of the valve element to connect the other compartment to the source whereby the force exerted by the spring means is removed from the movable wall when operating to transmit pressure; and operating mechanism carried by said movable wall for interconnecting said valve element and spring seat member for movement together.

6. A pressure-producing mechanism, comprising: a power cylinder; a differential pressure-responsive movable wall in the power cylinder; manually operatable valve means including a source of pressure different from atmosphere for controlling the differential pressures acting on the movable wall; yieldable pre-energized resilient means normally effective directly on both the valve means and movable wall to resist relative operating movement therebetween; means operably carried by said movable wall interconnecting said resilient means and said valve means to accommodate movement of said valve means relative to said wall in opposition to said resilient means, the opposition of said resilient means increasing in accordance with the distance the movable wall is moved in a pressure-producing direction, and such movement of the valve means rendering said resilient means ineffective to oppose movement of the movable wall when moving in said pressure-producing direction; and normally spaced engageable portions incorporated between said movable wall and valve means for defining the relative operating movement of the latter.

7. In a fluid pressure actuated servo motor for magnifying the effort applied by an operator movable control, a casing, a pressure-responsive element displaceable from a normal position in said casing to define separate variable compartments one of which is vented to a constant pressure, said pressure-responsive element including an output member, conduit means connecting another of said compartments to a source of pressure different from said constant pressure, valve means in said conduit means controlling the connection of said another compartment to said source, means connecting said valve to said control for co-movement, said element being displaceable in one direction upon connection of said source to said another compartment, spring means biasing said element in a direction opposite to said one direction, said element and said valve means being comovable in said opposite direction and said valve means being independently movable in said one direction, and means carried by said pressure-responsive element interconnecting said valve means and said spring means so that operator movement of said control to displace the valve means in said one direction will move said valve means relative to said element against the bias of said spring means to connect said another compartment to said source and to displace said element, said spring means thus resisting movement of said control, and a pair of engageable portions normally spaced from one another for defining the relative operating movement of said valve means.

8. In a fluid-pressure actuated servo motor, a casing, a fluid pressure-responsive element dividing the casing intrior into two compartments and including an output member projecting from the casing, one of said compartments being always vented to a constant pressure, and conduit means connecting the other of said compartments to a source of pressure different from said constant pressure: the improvements of a valve in said conduit means and coaxial with said element, said valve being axially displaceable in one direction relative to said element to connect said source with said other compartment to displace said element in the same direction, axial displacement of said valve in the other direction relative to said element disconnecting said source from said other compartment; spring means normally biasing said valve in the other direction relative to said element and operative to oppose movement of said element in said one direction; and abutment means juxtaposed with respect to said element and movable independently of said element upon movement of said valve in said one direction to accommodate movement of said element in said one direction free of the bias of said spring means.

9. In a fluid-pressure actuated servo motor, a casing, a fluid pressure-responsive element including an output member and dividing the casing interior into two compartments, one of said compartments being vented to a constant pressure, and conduit means connecting the other of said compartments to a source of pressure different from said constant pressure: the improvements of a valve in said conduit means and co-axial with said element, said valve being axially displaceable in one direction relative to said element to connect said source with said other compartment to displace said element in the same direction, axial displacement of said valve in the other direction relative to said element disconnecting said source from said other compartment; operator operatable means for moving said valve in said one direction; spring maens constantly opposing movement of said valve and said operator means in said one direction and normally urging said element in said other direction; and means carried by said element and actuatable by said operator means concurrently with movement of said valve in said one direction for rendering said spring means ineffective to oppose movement of said element in said one direction.

10. In a servo motor as defined in claim 8, the further improvement of said last-named means including a spring pressure plate, a connection between said plate and said valve accommodating joint movement of said plate and said valve in each direction, and a connection between said plate and said element accommodating joint movement of said plate and said element in only one direction.

11. In a servo motor as defined in claim 8, the further improvement of said operator means being a brake-pedal and said spring means being effective to impart "feel" to said pedal during movement of said element in each direction.

References Cited in the file of this patent

UNITED STATES PATENTS

| | | |
|---|---|---|
| 2,006,487 | Sorensen | July 2, 1935 |
| 2,130,799 | Hofstetter | Sept. 20, 1938 |
| 2,165,942 | Rossmann | July 11, 1939 |
| 2,207,700 | Porter | July 16, 1940 |
| 2,229,247 | Kamenarovic | Jan. 21, 1941 |
| 2,241,374 | Alfieri | May 13, 1941 |
| 2,260,491 | Stelzer | Oct. 28, 1941 |
| 2,360,578 | Porter | Oct. 17, 1944 |
| 2,395,223 | Ingres | Feb. 19, 1946 |
| 2,457,721 | Price | Dec. 28, 1948 |
| 2,458,803 | Stelzer | Jan. 11, 1949 |
| 2,526,457 | Bradbury | Oct. 17, 1950 |
| 2,532,960 | Stelzer | Dec. 5, 1950 |
| 2,642,165 | Banker | June 16, 1953 |
| 2,644,305 | Price et al. | July 7, 1953 |
| 2,683,352 | Price | July 13, 1954 |
| 2,685,170 | Price | Aug. 3, 1954 |
| 2,685,171 | Price | Aug. 3, 1954 |
| 2,685,172 | Price | Aug. 3, 1954 |
| 2,690,740 | Hupp | Oct. 5, 1954 |
| 2,745,383 | Hupp | May 15, 1956 |
| 2,790,306 | Ingres | Apr. 30, 1957 |

FOREIGN PATENTS

| | | |
|---|---|---|
| 172,797 | Austria | Oct. 10, 1952 |
| 747,273 | France | Mar. 28, 1933 |

UNITED STATES PATENT OFFICE
CERTIFICATE OF CORRECTION

Patent No. 2,903,855                                                                                         September 15, 1959

Glenn T. Randol

It is hereby certified that error appears in the printed specification of the above numbered patent requiring correction and that the said Letters Patent should read as corrected below.

Column 3, line 30, for "now" read -- not --; column 4, line 4, for "passed" read -- passes --; column 5, line 37, for "an auxiliary" read -- a similar --; line 74, for "156" read -- 158 --; column 6, line 2, for "158" read -- 156 --; column 8, line 31, after "and" insert -- the --; column 10, line 1, for "slower" read -- lower --; line 64, before "eonical" strike out "auxiliary"; line 67, for "106a" read -- 160 --; column 14, line 18, for "depicated" read -- depicted --; column 15, line 12, for "slideable" read -- slidable --; line 37, for "slideably" read -- slidably --; line 44, for "slideably" read -- slidably --; column 16, line 68, for "maens" read -- means --.

(SEAL)    Signed and sealed this 8th day of March 1960.

Attest:

KARL H. AXLINE                                                                               ROBERT C. WATSON Attesting Officer                                                                        Commissioner of Patents